United States Patent

[11] 3,590,589

| [72] | Inventor | August Hendrik Maria Smulders<br>Wassenaar, Netherlands |
|---|---|---|
| [21] | Appl. No. | 833,439 |
| [22] | Filed | June 16, 1969 |
| [45] | Patented | July 6, 1971 |
| [73] | Assignee | N. V. Industrieele Handelscombinatie<br>Rotterdam, Netherlands |
| [32] | Priority | June 17, 1968 |
| [33] |  | Netherlands |
| [31] |  | 6,808,498 |

[54] APPARATUS FOR BURYING PIPELINES
6 Claims, 3 Drawing Figs.

[52] U.S. Cl. .................................................. 61/72.4,
37/60, 37/69, 37/83, 37/86
[51] Int. Cl. ...................................................... E02f 5/06,
E02f 5/12, F16l 1/00
[50] Field of Search........................................... 61/72.4,
72.1; 37/60, 69, 83, 86

[56] References Cited
UNITED STATES PATENTS

| RE23,963 | 3/1955 | Collins | 61/72.4 |
|---|---|---|---|
| 1,270,142 | 6/1918 | Gage, Sr. | 37/60 X |
| 1,698,033 | 1/1929 | Storsand | 37/60 |
| 2,693,085 | 11/1954 | Salnikov | 61/72.4 |
| 3,103,790 | 9/1963 | Popich | 61/72.4 |

*Primary Examiner*—Jacob Shapiro
*Attorney*—Young & Thompson

ABSTRACT: Apparatus for burying pipelines combines a suction dredge for sand with an endless digger for clay. When the digger is used, the sand dredge is somewhat raised to remove the clay and also an auxiliary suction dredge is used for cleaning the digger, as well as a device for bevelling the edge of the dug trench so that the pipeline will settle into it.

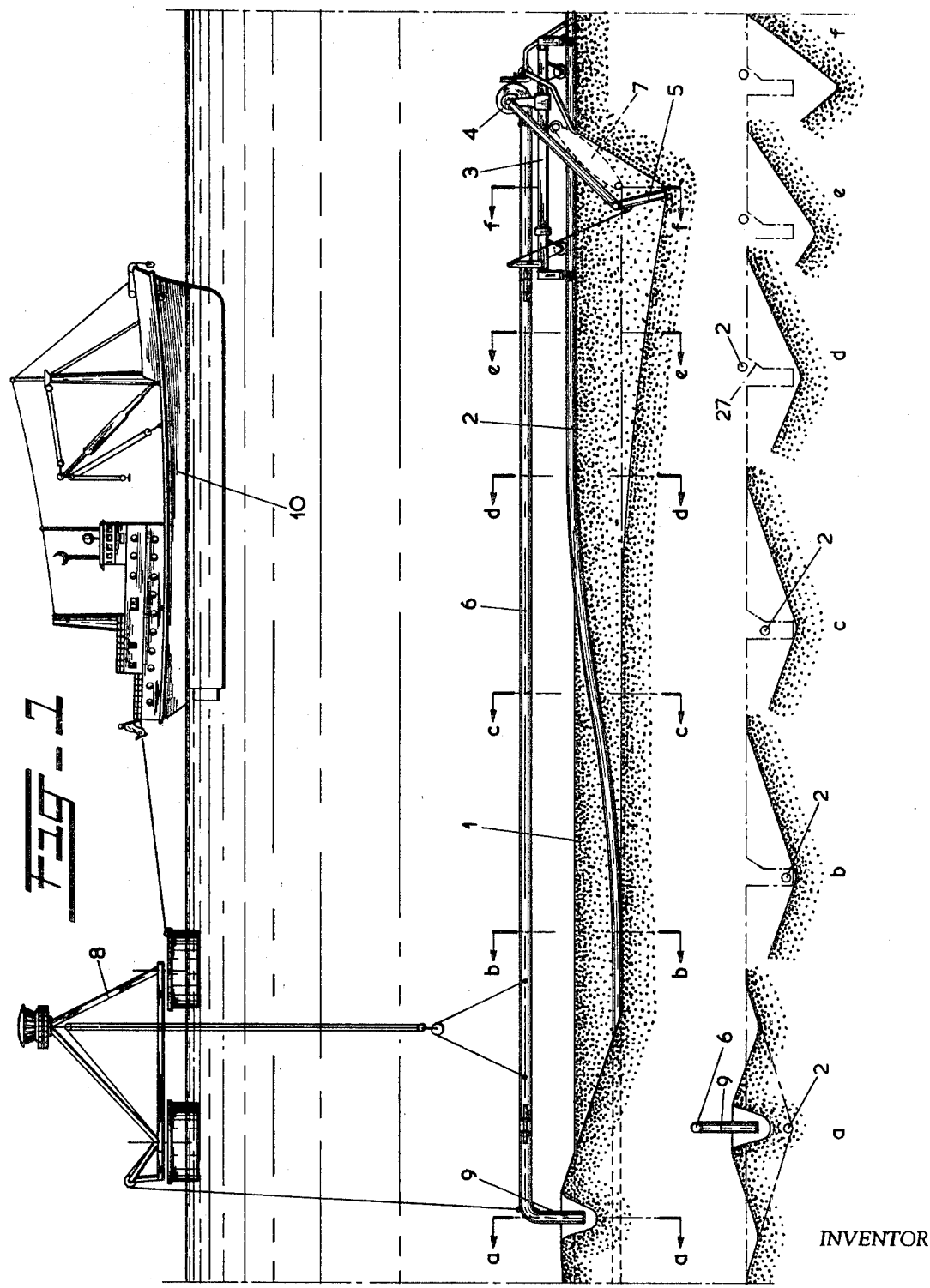

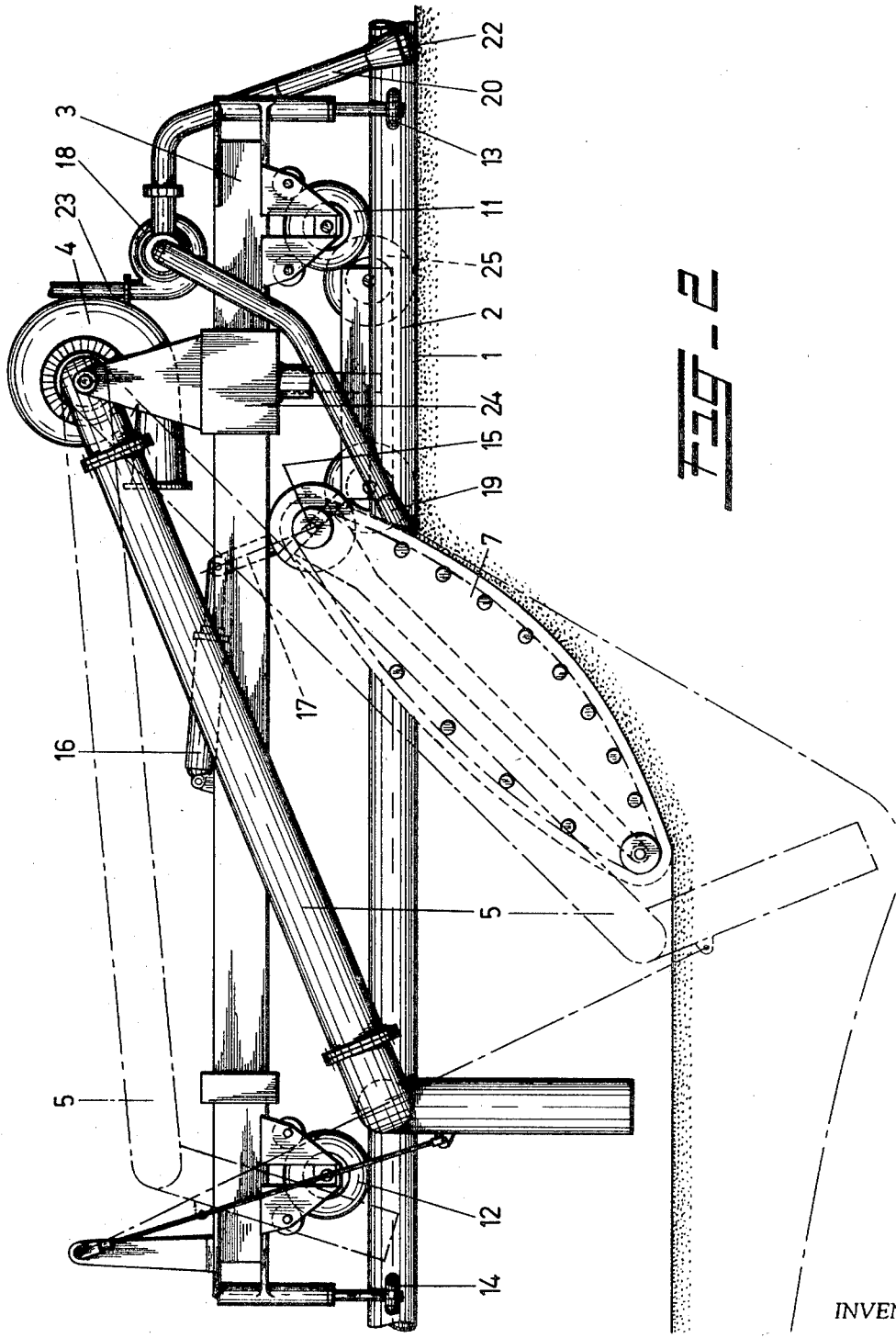

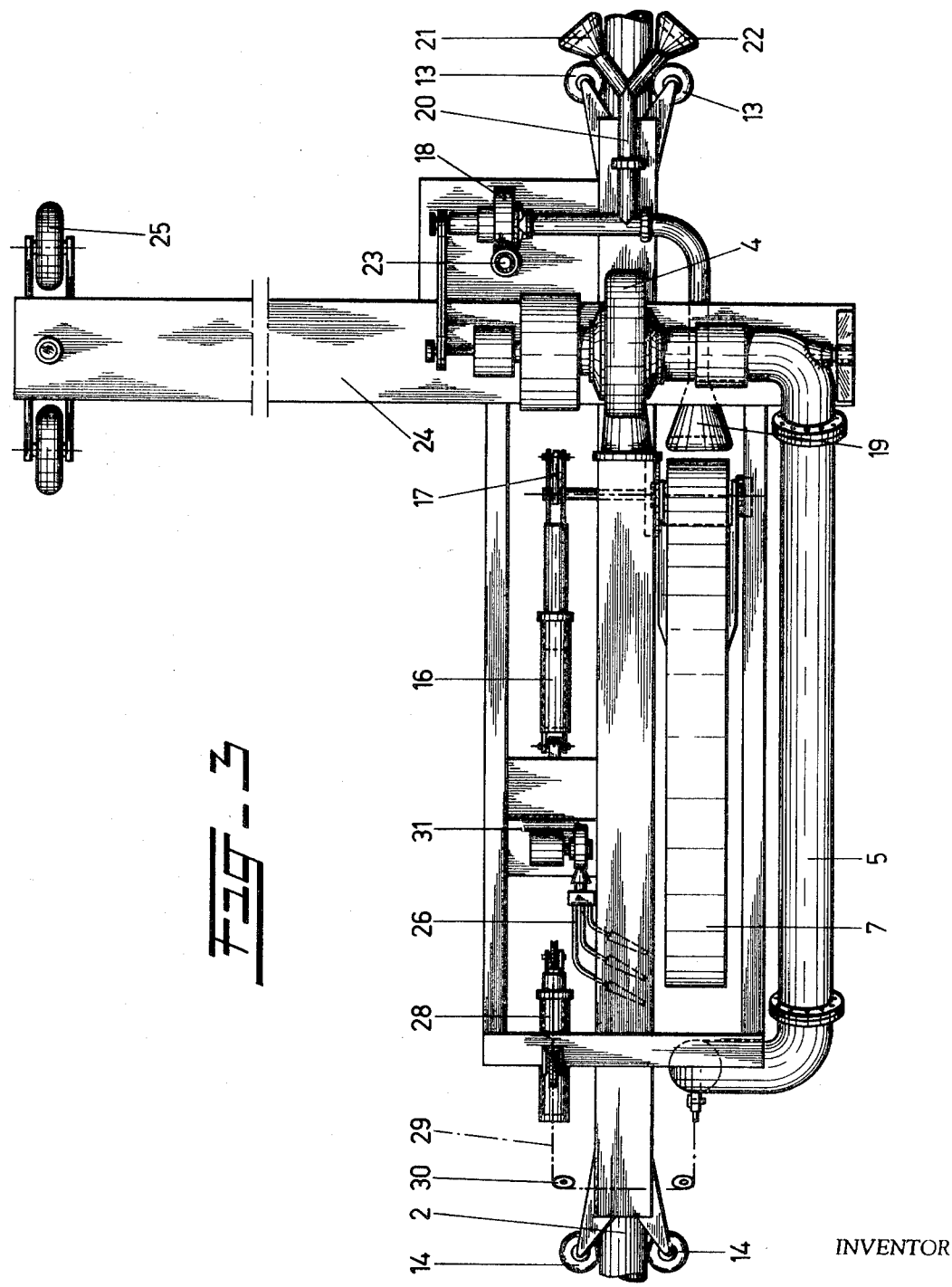

APPARATUS FOR BURYING PIPELINES

The present invention relates to apparatus for burying pipelines and other tubular conduits and the like, which will hereinafter be referred to for simplicity as "pipelines," that have been laid at the bottom of a body of water. It is desirable to bury such pipelines, not only to hold them down, but also to protect them from ships' anchors and other hazards.

In the past, pipelines have been buried by moving a suction dredge along the pipeline resting on the bottom, to form a generally V-shaped trough in the sand. The pipeline then settles into the bottom of the trough and the sand that has been sucked away can be directed back onto the pipeline in order to bury it.

However, difficulty is encountered when the path of the pipeline is marked by deposits of clay or other compacted material. Such deposits cannot be simply sucked up in a sand dredge but must be dug away, and the expense of laying the pipeline is greatly increased.

It is an object of the present invention to provide apparatus for burying pipelines, which will be operative not only in sand but also in more tenacious deposits such as clay.

Another object of the present invention is the provision of apparatus for burying pipelines, which will be relatively simple and inexpensive to manufacture, easy to assemble, operate, maintain and repair, and rugged and durable in use.

Other objects and advantages of the present invention will become apparent from a consideration of the following description, taken in connection with the accompanying drawings, in which:

FIG. 1 is an elevational view of the entire assembly of the present invention with the profiles of the resulting trench being indicated at the cross section $a-f$;

FIG. 2 is an enlarged elevational view of the right-hand fragment of FIG. 1; and FIG. 3 is a top plan view of the structure of FIG. 2.

Referring now to the drawings in greater detail, there is shown apparatus according to the invention, for burying in a seabed 1 a pipeline 2. The apparatus for doing this is shown at 3 and includes a double-acting pump 4 with an intake suction pipe 5 and an outlet pressure pipe 6. The apparatus 3 also includes an endless digger 7. In the illustrated embodiment, digger 7 is shown in the form of an endless chain having digging teeth or blades thereon. It will be understood, however, that digger 7 can also have other forms such as a rotor.

A floating platform 8 supports pressure pipe 6 adjacent its outlet end 9, which outlet end is sufficiently far from the apparatus 3, for example about 100 yards, that the pipeline will have reached the bottom of the trench by the time the outlet end 9 redeposits sand over the pipeline. The mother ship 10 drags the platform 8 and hence propels the apparatus 3 along the pipeline on the seabed.

The cross sections $a-f$ indicate in full line the profile which is obtained by the suction pipe 5 in sand; while the profile obtained by using the digger 7 in clay or the like is shown in phantom line.

The apparatus 3 is shown on a larger scale in FIGS. 2 and 3, and comprises a framework which is supported by wheels 11 and 12 on the pipeline 2. The wheels 11 and 12 may be power driven or not, by means not shown in the drawing. Horizontal guide wheels 13 and 14 also engage the sides of the pipeline to steady and guide the apparatus 3.

The endless digger 7 is pivotally mounted at 15 for vertical swinging movement and may be swung up or down by means of a fluid motor 16 which acts on a crank arm 17 rigid with the frame or digger 7. FIG. 2 shows digger 7 in operational position, for forming the greater portion of the trench shown in phantom line in section $a-f$. In FIG. 2, the suction pipe 5 is also shown in the position it occupies when the digger 7 is operative, the suction pipe 5 in that full line position in FIG. 2 then serving to remove sand and pieces of clay from the trench formed by the digger 7.

When the digger 7 is operational, an auxiliary pump 18 is also operative to withdraw the chunks of clay from between the digger teeth through a suction pipe 19 which opens on the outer side of the digger 7 just above the level of seabed 1. An additional suction pipe 20 with inlets 21 and 22 scavenges the pipeline in advance of the apparatus 3 to remove accumulations which might interfere with the guidance of the apparatus along the pipeline. The pressure pipe 23 of the auxiliary pump 18 may open into the main pressure pipe 6.

As seen in FIG. 3, the apparatus 3 also has an outrigger in the form of an arm 24 supported on the seabed by wheels 25 at its outer end, which is a substantial distance from the pipeline.

Apparatus is provided for vertically swinging the suction pipe 5 about the axis of pump 4, between the upper and lower phantom line positions shown in FIG. 2. In the uppermost of these positions, the suction pipe is inoperative. In the lowermost of these phantom line positions, the suction pipe is operative to dig the trench with inclined walls in the sandy bottom, the digger 7 then being raised and inoperative. The apparatus for thus vertically swinging suction pipe 5 comprises a fluid motor 28 whose piston rod is connected to a cable 29, this cable running over rollers 30 and being connected with the suction pipe 5 so that upon actuation of fluid motor 28 in either direction, the suction pipe 5 will be raised or lowered.

The framework of apparatus 3 also carries a pump 31 that forces sea water through a plurality of lances 26 downwardly and inwardly of the trench formed by the digger 7, thereby to form the bevel 27 shown in sections $b-f$ at one side of the trench cut by the digger 7. The purpose of thus bevelling off the side of the trench is to insure that the pipeline will settle into the trench. The digger must of course operate beside the pipeline and not in vertical alignment with it, so that the trench cut by the digger tends to be offset to one side of the pipeline. However, the presence of the bevel 27 insures that the falling pipeline will find its way to the bottom of the trench cut by the digger 7. Of course, bevel 27 could be formed by fixed or movable solid members carried by apparatus 3.

As will be evident from FIG. 3, the means for bevelling the edge 27 of the trench, such as the injection lances 26, are located after the digger 7 but before the suction pipe 5, with respect to the direction of travel of the apparatus, which makes it possible to carry off the clay cut loose to form the bevel, by means of suction pipe 5.

In operation, when the seabed is only sand, the suction pipe 5 is lowered to its lowermost position shown in FIG. 2 and the digger 7 is raised, and the apparatus proceeds along the pipeline digging the broad trench with inclined sidewalls shown in full line in sections $b-f$. The pipeline settles by gravity into the bottom of the trench, after which the outlet end 9 of the pressure pipe 6 largely refills the trench with previously removed sand, as shown in section $a$ of FIG. 1.

But when clay or other compacted formations are encountered, then the suction pipe 5 is raised to the full line position of FIG. 2 and the digger 7 is operative to cut the narrow trench with upright sidewalls shown in phantom line in sections $b-f$. The clay that would otherwise accumulate in and clog the digger blades or teeth is removed by the suction pipe 19, while loose clay and sand is removed from the trench behind the digger 7 by means of the suction pipe 5 in its full line position in FIG. 2. At the same time, the lances 26 cut the bevel 27 so that the pipeline again finds its way by gravity to the bottom of the trench and is again covered with sand and clay by the outlet end 9 of the pressure pipe 6, as again shown in section $a$ of FIG. 1.

With the digger 7 raised to a horizontal position and the suction pipe 5 raised to the uppermost phantom line position shown in FIG. 2, the apparatus can simply be moved along the pipeline without cutting any trench either in sand or in clay.

From a consideration of the foregoing disclosure, therefore, it is evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What I claim is:

1. In an apparatus for burying a pipeline in the bottom of a body of water, comprising a suction pipe for digging a trench subject to the pipeline and means for moving the suction pipe along the pipeline; the improvement comprising a digger including an endless member that circulates in an upright plane and that has digging elements thereon for penetrating coherent soil formation, means mounting the digger on the apparatus for vertical movement relative to the apparatus and relative to the suction pipe in advance of the suction pipe, and an auxiliary suction pipe in advance of the path of the digger to remove material excavated by the digger.

2. Apparatus as claimed in claim 1, and means mounting the first-named suction pipe on the apparatus for vertical movement relative to and independently of the digger.

3. Apparatus as claimed in claim 1, said first-named suction pipe being positionable in the trench cut by the digger behind the digger with respect to the direction of movement of the apparatus.

4. Apparatus as claimed in claim 3, and bevelling means for bevelling an edge of the trench cut by the digger, said bevelling means being disposed between the digger and the first-mentioned suction pipe.

5. Apparatus as claimed in claim 4, said bevelling means comprising lances for cutting the sidewall of the trench with jets of water.

6. Apparatus as claimed in claim 1, and means mounting said first-mentioned suction pipe for vertical movement between positions above and below the lowermost portion of the digger.